United States Patent
Fang et al.

(10) Patent No.: US 11,071,185 B2
(45) Date of Patent: Jul. 20, 2021

(54) LED ARRANGEMENT WITH OVER-CURRENT PROTECTION

(71) Applicant: SIGNIFY HOLDING B.V., Eindhoven (NL)

(72) Inventors: Yuhong Fang, Naperville, IL (US); Ernesto Mendoza, Rosemont, IL (US); Ameya Dilip Shrotriya, Schaumburg, IL (US)

(73) Assignee: Signify Holding B.V., Eindhoven (NL)

( * ) Notice: Subject to any disclaimer, the term of this patent is extended or adjusted under 35 U.S.C. 154(b) by 0 days.

(21) Appl. No.: 16/484,819

(22) PCT Filed: Feb. 13, 2018

(86) PCT No.: PCT/EP2018/053557
§ 371 (c)(1),
(2) Date: Aug. 8, 2019

(87) PCT Pub. No.: WO2018/149824
PCT Pub. Date: Aug. 23, 2018

(65) Prior Publication Data
US 2019/0373689 A1    Dec. 5, 2019

Related U.S. Application Data

(60) Provisional application No. 62/461,039, filed on Feb. 20, 2017.

(30) Foreign Application Priority Data

Mar. 7, 2017 (EP) .................................... 17159535

(51) Int. Cl.
*H05B 45/50* (2020.01)

(52) U.S. Cl.
CPC .................................. *H05B 45/50* (2020.01)

(58) Field of Classification Search
CPC ........ H05B 45/00; H05B 45/10; H05B 45/30; H05B 45/50; H05B 47/00; H05B 47/10; H05B 47/20
See application file for complete search history.

(56) References Cited

U.S. PATENT DOCUMENTS

| | | |
|---|---|---|
| 8,350,500 B2 | 1/2013 | Negley et al. |
| 8,536,788 B2 | 9/2013 | Antony et al. |
| 8,937,442 B1 | 1/2015 | Qi |
| 2011/0109231 A1 | 5/2011 | Shiu et al. |
| 2012/0223644 A1 | 9/2012 | Wang et al. |
| 2013/0200812 A1* | 8/2013 | Radermacher ......... H05B 33/08 315/186 |
| 2015/0366014 A1* | 12/2015 | Itoh ..................... H02M 3/1582 315/200 R |

FOREIGN PATENT DOCUMENTS

WO    2012018915 A2    2/2012

* cited by examiner

*Primary Examiner* — Jimmy T Vu
(74) *Attorney, Agent, or Firm* — Daniel J. Piotrowski

(57) ABSTRACT

An LED board comprises an arrangement of LEDs, a current sensor for sensing a current flowing through the arrangement of LEDs and a cut-off switch in series with the arrangement of LEDs. The cut-off switch is controlled in dependence on the sensed current. In this way, over-current protection is provided at the LED board level, without needing any signal communication between the LED board and the LED driver.

7 Claims, 3 Drawing Sheets

LED ARRANGEMENT WITH OVER-CURRENT PROTECTION

CROSS-REFERENCE TO PRIOR APPLICATIONS

This application is the U.S. National Phase application under 35 U.S.C. § 371 of International Application No. PCT/EP2018/053557, filed on Feb. 13, 2018, which claims the benefit of U.S. Provisional Patent Application No. 62/461,039, filed on Feb. 20, 2017 and European Patent Application No. 17159535.8, filed on Mar. 7, 2017. These applications are hereby incorporated by reference herein.

FIELD OF THE INVENTION

This invention relates to LED arrangements, and relates in particular to the provision of over-current protection.

BACKGROUND OF THE INVENTION

An LED lighting fixture typically consists of LED drivers and LEDs on PCB boards. The LEDs are connected in series or parallel, or in a network of series and parallel connections.

To make sure the LEDs output the correct lighting level and have a long lifetime, the correct current needs to be provided to the LEDs. For a given fixture, the number of LEDs and LED type are fixed, and the current rating is also fixed.

US2011/0109231 shows an example of LED current control wherein the LED current control circuit is adapted to the LED module. US2011/0109231 discloses a regulation and a protection of the LED module which is made on the LED driver side.

US2012/0223644 shows a LED driving circuit providing current to a LED module that fit together. US2012/0223664 discloses current protection and regulation.

However, in many LED lighting applications, LED drivers are designed to be configurable. The LED driver output current can be configured or adjusted to drive different LEDs and fit into different LED fixtures.

There are many ways to configure an LED driver, for example using a resistor which is part of the LED board to set the output current. This current setting resistor ("Rset") provides a simple way for information to be provided from the LED board to the driver. Alternatively, digital communication may be used to set the output current, such as the DALI protocol or other digital protocol, or else near field communication may be used.

When a driver is configurable, there may be safety issues resulting from the particular LED PCB boards that the driver is used to drive. For example, if the LED driver is configured with a reduced output current (compared to its maximum) to match the LED rating, if the configuration fails or a mistake is made, the real current delivered to the LEDs can be much higher. The LEDs will be over-driven, and the over-current in the LEDs can cause high temperatures and even present a fire risk. If a resistor is used for the current setting configuration, the resistor can become open circuit, or become disconnected, thus causing potential over-current issues or over-heating. This is a critical safety issue.

There are different ways to solve this issue.

Thermal protection may be used to detect overdriving of the LED board as well as other error conditions. For example, a temperature sensor (with a negative temperature coefficient of resistance—NTC) may be placed on the LED board. The sensor is then connected to the LED driver through cables. When the LED board has a high temperature, the driver receives the signal, then shuts down the driver or reduces the output current.

This method has some drawbacks. The temperature sensor needs to be connected to the driver through cables or wires. If the wires or cable are broken, the protection is lost. In an application with multiple LED boards, each LED board has a temperature sensor, and this complicates the connection. The wires or cables and their connections also increase cost of the fixture.

An alternative solution is to place a thermal protection system fully on the LED board. A first known example for thermal protection provides a thermal fuse on the LED board. Thermal fuses are usually self-heating devices. They usually have a high tolerance and have a slow response time. When a thermal fuse is triggered, the LED board is damaged, and has to be replaced, which increases the installation cost. Another drawback of a thermal fuse is that it has a high internal resistance. In normal applications, it consumes power which causes a reduced system efficiency.

A second known example for thermal protection is to provide a bimetallic thermostatic switch on the LED board, which functions as a thermal switch. This however increases the size and cost and may not be easy to mount on the LED board.

Another example of thermal protection on the LED board is disclosed in WO2012/018915.

These thermal protection systems are slow to respond, and may only respond after there has been damage to the LED board.

There is therefore a need for a protection mechanism which enables reliable detection of an error condition, with a simple low cost architecture.

SUMMARY OF THE INVENTION

The invention is defined by the claims.

According to examples in accordance with an aspect of the invention, there is provided an LED board adapted to be wire-connected to a separate LED driver, comprising:
  a circuit board which carries:
  an arrangement of LEDs;
  a current sensor for sensing a current flowing through the arrangement of LEDs;
  a cut-off switch in series with the arrangement of LEDs; and
  a switch control circuit which is adapted to control the cut-off switch in dependence on the sensed current.

This arrangement provides current sensing locally on the LED board, so that a safety cut-off may be implemented. Current protection enables more accurate sensing and it can be detected before any risk, whereas temperature sensing has a slower response time. Excessive current is the most likely cause of increased temperatures, so that over-current protection may also function as a more rapid or even predictive approach for providing temperature protection.

The protection trigger point for the LED arrangement current can be precisely set. By using a series switch, the protection can be triggered and released unlimited times. The circuit components may all be implemented as low cost surface mount semiconductor components, which have long life. During normal operation, the protection circuit elements may be configured to consume very low power, thereby maintaining a high system efficiency.

The switch control circuit may comprise a reference voltage unit and a comparison circuit for comparing the current sensor signal with a voltage reference set by the reference voltage unit. This enables a simple voltage comparison to be used for the over-current detection.

The voltage reference unit may comprise a resistor-diode circuit for generating an internal supply voltage and a resistor divider for generating the reference voltage from the internal supply voltage. The internal supply voltage may be based on a Zener diode voltage which provides a constant reference regardless of the drive voltage to the LED board.

In one set of examples, the switch control circuit comprises a timing circuit. This may be used to provide the cut-off function for a particular time period. In this way, the cut-off function is not permanent, but operates in a cyclic manner, ensuring that any present over-current condition is not allowed to remain active for a sufficient period of time to cause thermal or other damage.

The timing circuit may comprise a feedback circuit between the comparison circuit output and input, which comprises a capacitor adapted to charge when the cut-off switch is closed and to discharge when the cut-off switch is open. The charging and discharging of the capacitor may thus be used to set a cut-off period of the switch, and thus implements an automatic switch reset function.

The timing circuit may for example comprise a resistor and diode in parallel and the capacitor in series with the parallel resistor-diode.

In another set of examples, the switch control circuit may comprise a latch circuit. This provides a more permanent cut-off function, but without causing any damage to the circuit. The cut-off function is reset when the voltage supply to the LED board is turned off.

The latch circuit may comprise a transistor circuit coupled to a control input of the cut-off switch. Various transistor-based latch circuits are possible.

The circuit board may further carry a temperature sensor, and the switch control circuit may be further adapted to control the cut-off switch in dependence on the sensed temperature.

In this way, both current and temperature sensing may be provided. Most temperature issues will be prevented by the current protection, but if there are circuit defects causing temperature issues which do not relate to excessive current flow, these may also be detected.

The switch control circuit for example comprises a reference voltage unit, a resistor thermal sensor, and a comparison circuit having hysteresis. The comparison circuit and reference voltage unit may of course be the same circuit blocks as used for the current protection.

Again, the voltage reference unit may comprise a resistor-diode circuit for generating an internal supply voltage and a resistor divider for generating the reference voltage from the internal supply voltage.

The comparison circuit preferably comprises a comparator, the reference voltage is provided to a first comparator input, the switch control circuit comprises a second resistor divider which includes the resistor thermal sensor, the output of the second resistor divider is provided to a second comparator input and the comparison circuit further comprises a feedback resistor arrangement for implementing the hysteresis.

In this way, there are two resistor dividers which define the two comparator inputs, one of which is temperature-sensitive. The feedback resistor arrangement defines the hysteresis so that a delay is implemented before the cut-off switch is turned back on after an over-temperature event.

The invention also provides a luminaire comprising:
a configurable LED driver; and
an LED board as defined above.

Examples in accordance with another aspect of the invention provide a method of providing over-current protection locally on an LED board wire-connected to a LED driver, the method comprising:
sensing a current flowing through an arrangement of LEDs;
controlling a cut-off switch in series with the arrangement of LEDs in dependence on the sensed current.

The cut-off switch may be controlled to implement a timed cut-off period, or to implement a latched cut-off.

BRIEF DESCRIPTION OF THE DRAWINGS

Examples of the invention will now be described in detail with reference to the accompanying drawings, in which.

DETAILED DESCRIPTION OF THE EMBODIMENTS

The invention provides an LED board which comprises an arrangement of LEDs, a current sensor for sensing a current flowing through the arrangement of LEDs and a cut-off switch in series with the arrangement of LEDs. The cut-off switch is controlled in dependence on the sensed current. In this way, over-current protection is provided at the LED board level, without needing any signal communication between the LED board and the LED driver.

Figure 1:
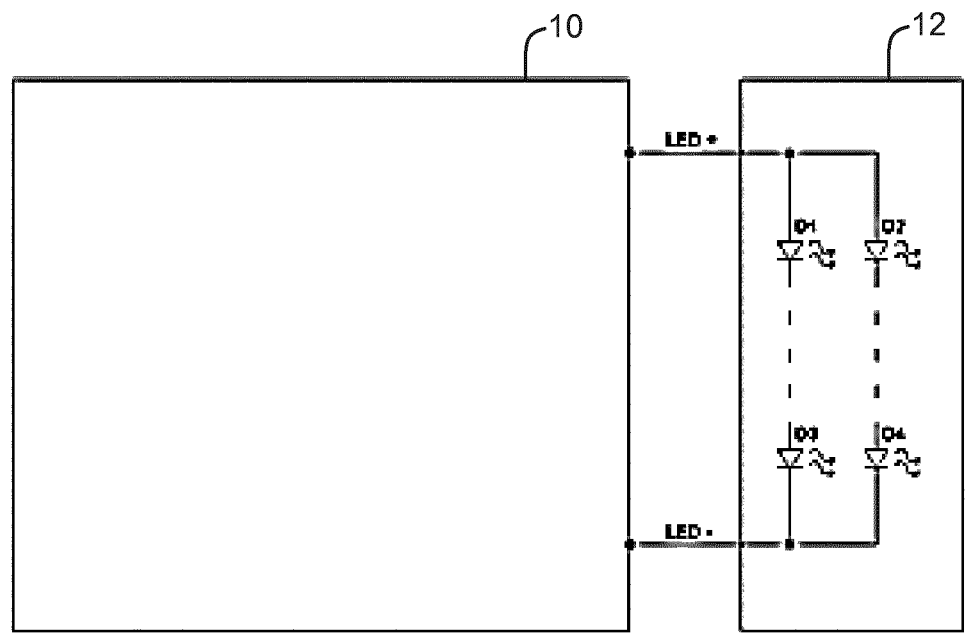
FIG. 1 shows a typical LED lighting fixture in which a configurable LED driver drives an LED board.

FIG. 1 shows a typical LED lighting fixture in which a configurable LED driver 10 drives an LED board 12. Together they form a luminaire. On the LED board 12, there are multiple LEDs are connected in parallel and/or in series. FIG. 1 shows a set of parallel LED strings, represented by diodes D1, D2, D3 and D4.

The LED driver 10 provides correct current to the LED boards. The LED driver 10 is configurable so that it can operate at different current settings for different LED arrangements. If the output current is programmed with wrong value, the LEDs could be over-driven, which causes temperature related problems and may even result in safety issues.

Figure 2:
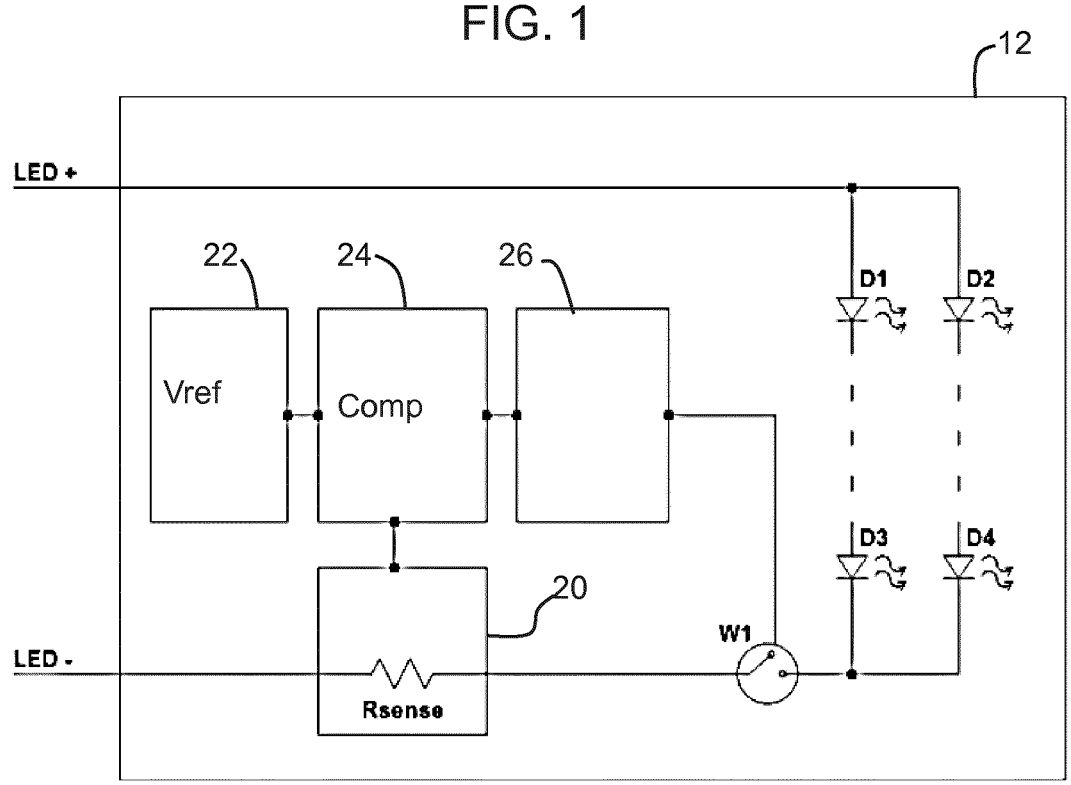
FIG. 2 shows an LED board which is adapted to provide local over-current protection.

FIG. 2 shows an LED board 12 which is adapted to provide local over-current protection.

The LED board 12 carries the arrangement of LEDs D1, D2, D3, D4 and an over-current protection circuit. The over-current protection circuit comprises a current sensor 20 for sensing a current flowing through the arrangement of LEDs and a cut-off switch W1 in series with the arrangement of LEDs. A switch control circuit 22, 24, 26 is adapted to control the cut-off switch W1 in dependence on the sensed current.

The cut-off switch W1 is provided solely as a protection element. It performs over-current protection and optionally also over-temperature protection as described further below. However, it does not perform any normal driver function and is thus not part of the LED driver. During normal operation of the LED board, with the LEDs driven to their desired illumination levels, the cut-off switch remains closed. The LED driver is separate to the LED board and connects to the LED board through a wired interface. The LED driver has its own separate PCB. The LED driver for example comprises a switch mode power supply which includes a power switch for controlling current flow through a power inductor. The power switch of the LED driver is thus on a separate board to the cut-off switch and they are separate devices.

Current sensing is provided locally on the LED board, so that a safety cut-off may be implemented. The switch control circuit comprises a reference voltage unit 22 and a comparison circuit 24 for comparing the current sensor signal with a voltage reference set by the reference voltage unit. This enables a simple voltage comparison to be used for the over-current detection. A switch driver circuit 26 controls the cut-off switch W1.

Current protection enables more accurate sensing and it can be detected before any high temperature risk, whereas temperature sensing has a slower response time.

When the current flowing is higher than a set point, the protection is triggered. The switch W1 will then be turned off. When the switch is turned off, the current becomes zero straight away. As discussed in further detail below, the switch driver circuit 26 may comprise a latch circuit which will latch the switch W1 to off permanently, or else the switch driver circuit may comprise a timing circuit which keeps the switch W1 off for certain time and turns the switch back on again after a preset time.

When a timing circuit is used, if the current is still high, then the circuit will enter into another protection cycle. The LED arrangement will thus be operated in a hiccup mode. The timing circuit is designed in such a way that the average current in LEDs will not give rise to an over temperature condition.

Figure 3:
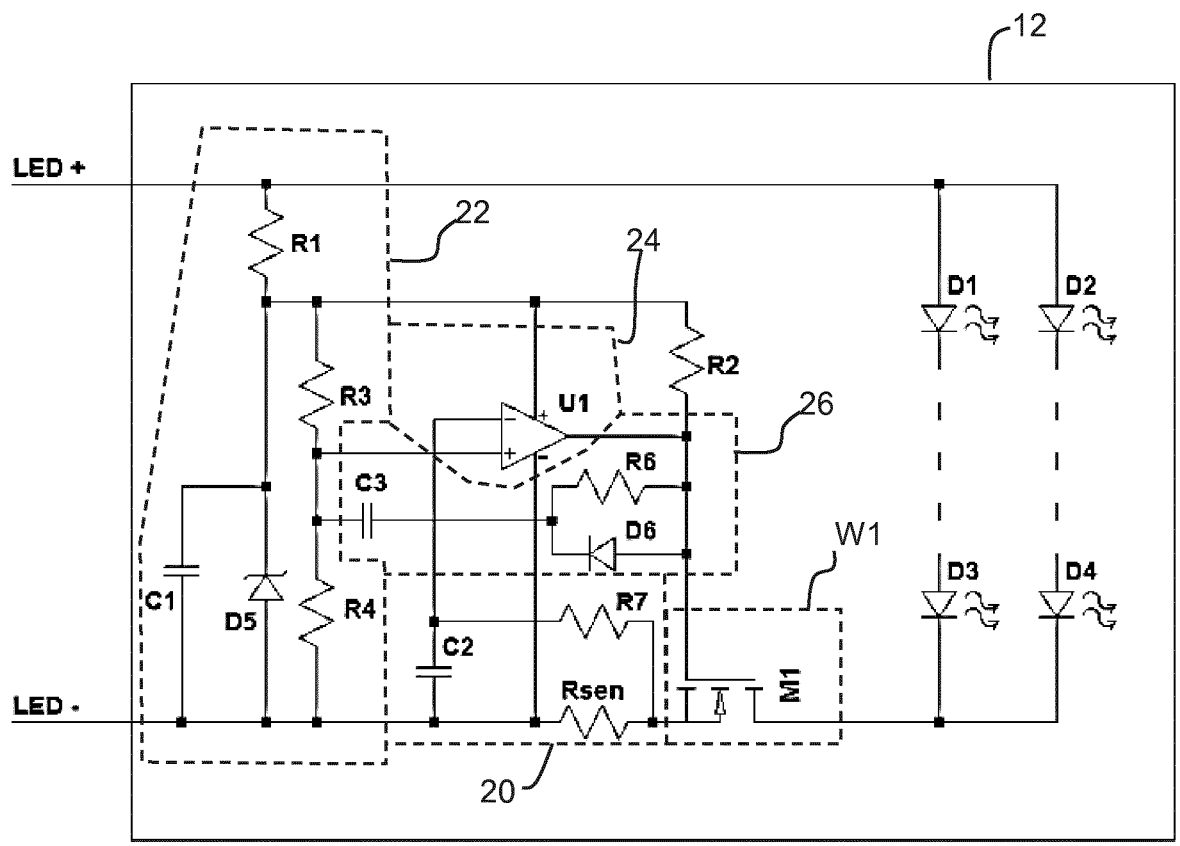
FIG. 3 shows a first, more detailed example of the circuit of FIG. 2.

FIG. 3 shows an example of the circuit of FIG. 2 with a timing circuit.

The voltage reference unit 22 comprises a resistor-diode circuit of resistor R1, Zener diode D5, and capacitor C1 for generating an internal supply voltage (at the lower terminal of R1) and a resistor divider R3, R4 for generating a reference voltage from the internal supply voltage. The internal supply voltage is in particular dependent on the Zener diode conduction voltage. The internal supply voltage is used to drive the gate of the cut-off switch W1 through a resistor R2. The cut-off switch is implemented as a MOSFET transistor M1 in this example.

The reference voltage is provided the non-inverting input of a comparator U1 of the comparison circuit 24.

The current sensor 20 comprises a current sense resistor Rsen combined with a low pass filter R7 and C2 which filters out high frequency ripple. It provides a signal to the inverting input of the comparator.

The timing circuit 26 comprises capacitor C3, diode D6 and resistor R6. The timing circuit is a feedback circuit between the comparator output and non-inverting input. The capacitor is adapted to charge when the cut-off switch is closed and to discharge when the cut-off switch is open. The circuit has the resistor R6 and diode D6 in parallel and the capacitor C3 in series with the parallel resistor-diode. The diode allows current flow from the comparator output to the capacitor C3 during charging and it discharges through resistor R6 hence with a larger time constant and slower response.

In a normal operating state, the current provided by the driver is below the LED rating, so that the voltage across the sensing resistor Rsen is lower than the threshold determined by the resistor divider R3 and R4. The output of the comparator U1 is therefore high and the cut-off switch M1 is turned on. The LEDs are thus powered by the driver normally.

During this time, the capacitor C3 of the feedback timing circuit 26 is charged up from the internal supply voltage by diode D6.

When the current in the LEDs is higher than the rating, the voltage across the current sense resistor Rsen is higher than the threshold, so the output of the comparator U1 become low. The cut-off switch M1 is turned OFF, and the LEDs are protected.

At same time, the non-inverting input of the comparator U1 is pulled to a negative level by the capacitor C3. The output of the comparator U1 will be kept low.

However, the capacitor C3 will then be discharged through the resistor R6 in the feedback timing circuit 26 and through the resistor divider resistors R3 and R4 slowly. The voltage at the non-inverting input of the comparator U1 will slowly increase.

When the voltage at the non-inverting input becomes zero and then slightly higher, the output of the comparator U1 will become high again. In this way, the cut-off switch M1 is turned on, and the LEDs are powered again. The circuit then goes into next protection cycle.

Thus, it can be seen that the charging and discharging of the capacitor in the feedback timing circuit dictates the timing of the off period of the cut-off switch.

Figure 4:
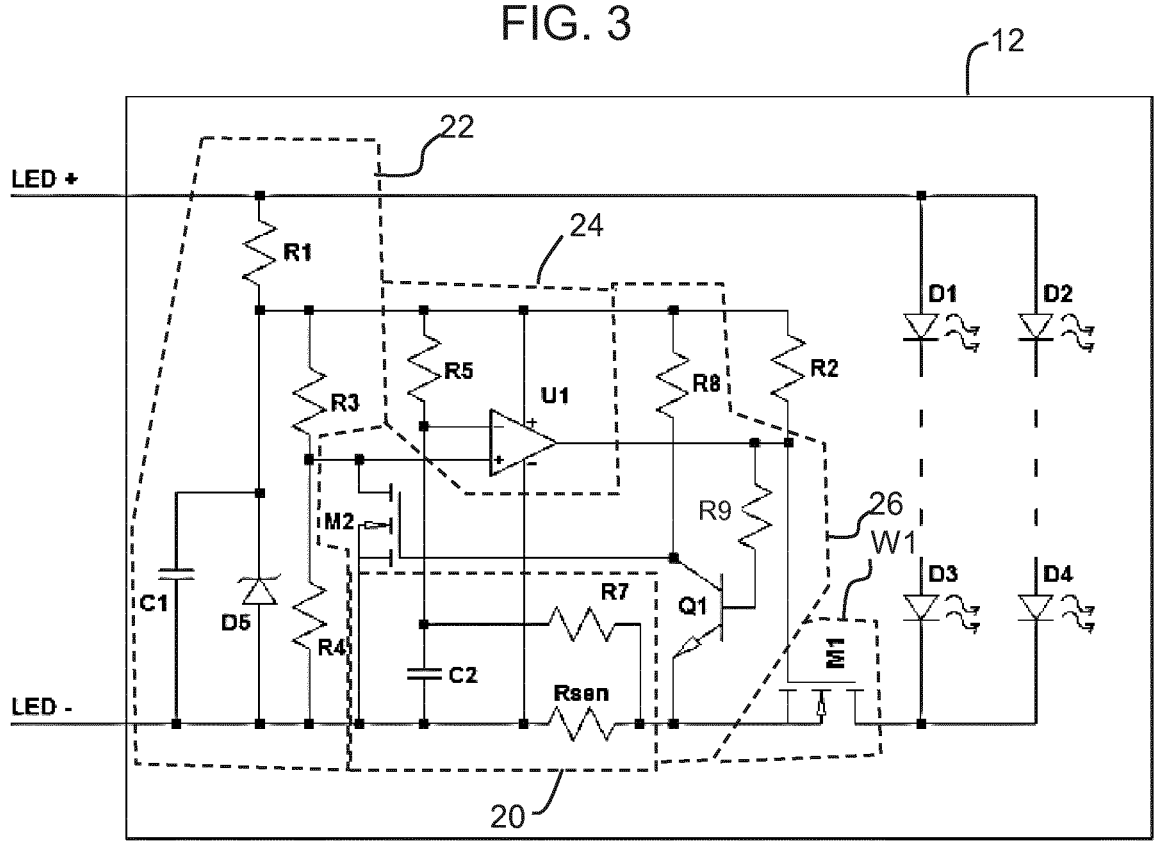
FIG. 4 shows a second, more detailed example of the circuit of FIG. 2.

FIG. 4 shows an example in which the switch driver circuit 26 provides a latching function.

The same references are used as in the circuit of FIG. 3 for the components that perform the same function.

Thus, R1, C1 and D5 again create a power supply to power the rest of the circuit and resistor divider R3, R4 provides a reference voltage. The current sensing resistor Rsen is again combined with filter R7 and C2.

In this circuit, a MOSFET M2 is connected between the reference voltage and the low voltage rail LED. It is controlled by a small signal transistor Q1 with a collector resistor R8 and a base resistor R9. These two transistors and associated resistors create a latch circuit.

In the normal operating state, the current provided by the driver is below the rating of the LEDs, so the voltage across the current sensing resistor Rsen is lower than the threshold determined by the resistor divider R3, R4. The output of the comparator U1 is high. The cut-off transistor M1 is turned on and the LEDs are powered by the driver normally.

At the same time, the transistor Q1 is turned on, and MOSFET M2 is turned off. When the current in the LEDs is higher than the rating, the voltage across the current sense resistor Rsen is higher than the threshold, so the output of the comparator U1 become low so that the cut-off transistor M1 is turned off and the LEDs are protected.

The current in LEDs becomes zero and the voltage across the current sense resistor Rsen become zero.

A bias resistor R5 is provided between the internal power supply and the non-inverting input of the comparator U1 (not needed in FIG. 3). This creates a small bias voltage at the inverting input of the comparator U1. At the same time, transistor Q1 is tuned off, and the MOSFET M2 is turned on. The non-inverting input of the comparator U1 is pulled to zero by the MOSFET M2. The voltage at the non-inverting input is thus always lower than the inverting input which has the bias voltage created by resistor R5. The output of the comparator U1 is in this way latched low. The cut-off switch M1 is latched off permanently.

The LED board may additionally include direct temperature protection, as well as indirect temperature protection based on over-current protection.

Figure 5:
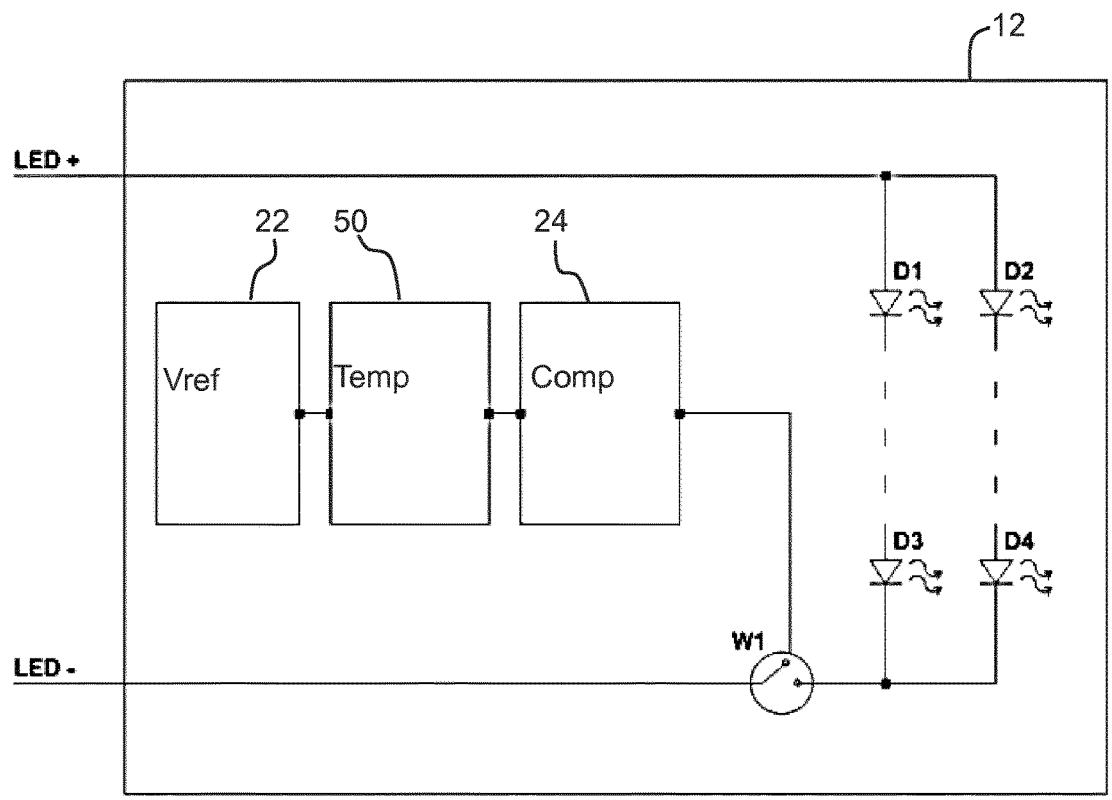
FIG. 5 shows an LED board which is adapted to provide local over-temperature protection.

FIG. 5 shows the arrangement in schematic form. The protection circuit includes a voltage reference circuit 22 as discussed above, and a temperature sensing circuit 50. The same cut-off switch W1 may be used and there is an associated comparison circuit 24 for controlling the switching of the cut-off switch W1.

The temperature sensing circuit 50 senses the temperature on the LED board. The protection circuit sets the protection trigger point and also implements a hysteresis when driving the cut-off switch W1. When the temperature is above a limit, the cut-off switch is turned off, so the LEDs are protected from over temperature. When the temperature drops below a certain level (which is different to the initial threshold as a result of the hysteresis), the cut-off is turned on again.

Figure 6:
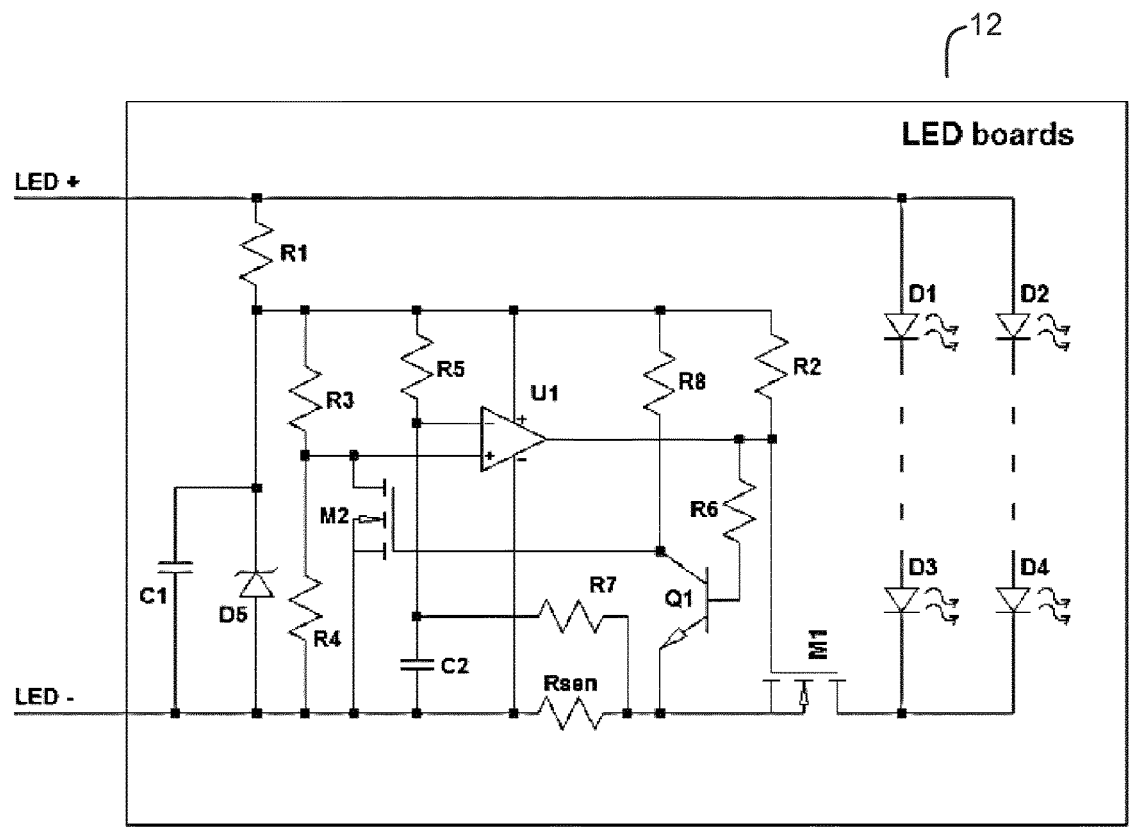
FIG. 6 is a more detailed example of the circuit of FIG. 5.

FIG. 6 is an example of a circuit for implementing this functionality.

The same references are used as in the circuits of FIGS. 3 and 4 for the components that perform the same function.

Thus, the resistor R1, capacitor C1 and diode D5 again create the internal supply voltage, for example 5V, and the resistor divider R3, R4 provides the reference voltage to the non-inverting input of the comparator U1 of the comparison circuit 24.

The temperature sensing circuit 50 takes the form of a second resistor divider formed by resistor R10 and a resistor thermal sensor RNTC (a resistor with a negative temperature coefficient of resistance). The output of the second resistor divider is provided to the inverting input of the comparator U1. The comparison circuit 24 further comprises a feedback resistor arrangement (single resistor R11 in this example) for implementing the hysteresis. It is part of a positive feedback path of the comparator U1.

The comparator U1, and associated resistors R3, R4, R11, R2 and R10 set the temperature protection trigger point and hysteresis.

During normal operation, the output of the comparator U1 is high, so the cut-off switch M1 is on. The resistors R3, R4 and R11 determine the voltage at the non-inverting input of the comparator U1. The resistors RNTC and R10 set the voltage at the inverting input of the comparator U1. When the temperature is in the normal range, the resistor RNTC has a relatively high value, so the voltage at the inverting input of the comparator U1 is low, and lower than at the non-inverting input, so the output of comparator U1 is high.

When the temperature increases, the resistance of the resistor RNTC decreases, so the voltage at the inverting input increases. When the temperature reaches the trigger point, the voltage at the inverting input becomes equal to the voltage at the non-inverting input and then slightly higher, so the output of comparator U1 becomes low, to turn off the cut-off switch M1.

At the same time, the voltage at the non-inverting input is pulled low by resistor R11. This provides hysteresis for the protection. The cut-off switch M1 will thus maintain its off state. After the cut-off transistor M1 turns off, there is no current in the LEDs, so the temperature on the LEDs starts to drop and the resistance of the resistor RNTC increases.

The voltage at the inverting input of the comparator U1 thus decreases. When the temperature drops to a second trigger temperature, the voltage at the inverting input is equal to or lower than the voltage at the non-inverting input of the comparator so that the output becomes high again. The cut-off switch M1 is then turned on, and the LEDs are repowered.

In this way, the temperature on the LED board will oscillate between the two trigger temperatures and hence always kept below the upper limit.

The two protection mechanisms are provided by a single circuit, and they can share the reference voltage circuit, and cut-off switch (so that the cut-off switch is switched off based on either control signal being present), or else they may be separate. There may be two cut-off switches in series although this will increase the total losses.

The current sensing approach may be based on the total current flowing to the LED arrangement as in the examples above. However, there may be current monitoring of the current flowing only in a sub-set of representative ones of the LEDs.

The circuit examples are low cost and may use only SMD components, creating a low cost compact and energy efficient design. Other specific circuits may be used to achieve the functionality explained above.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. An LED board adapted to be wire-connected to a separate LED driver, comprising:
   a circuit board which carries:
      an arrangement (D1, D2, D3, D4) of LEDs;
      a current sensor for sensing a current flowing through the arrangement of LEDs;
   a cut-off switch (W1) in series with the arrangement of LEDs;
   a switch control circuit which is adapted to control the cut-off switch in dependence on the sensed current;
      wherein the switch control circuit comprises a reference voltage unit and a comparison circuit for comparing the current sensor signal with a voltage reference set by the reference voltage unit; and
      wherein the reference voltage unit comprises a resistor-diode circuit (R1, C1, D5) for generating an internal supply voltage and a resistor divider (R3, R4) for generating the reference voltage from the internal supply voltage.

2. An LED board as claimed in claim 1, wherein the switch control circuit comprises a timing circuit.

3. An LED board as claimed in claim 1, wherein the switch control circuit (26) comprises a latch circuit (Q1, M2, R8, R9).

4. An LED board as claimed in claim 3, wherein the latch circuit comprises a transistor circuit (Q1, M2) coupled to a control input of the cut-off switch (W1).

5. A luminaire comprising: a configurable LED driver; and
   an LED board as claimed in claim 1.

6. An LED board adapted to be wire-connected to a separate LED driver, comprising:
   a circuit board which carries:

an arrangement (D1, D2, D3, D4) of LEDs; a current sensor for sensing a current flowing through the arrangement of LEDs; a cut-off switch (W1) in series with the arrangement of LEDs; and a switch control circuit which is adapted to control the cut-off switch in dependence on the sensed current;

wherein the switch control circuit comprises a timing circuit;

wherein the switch control circuit comprises a reference voltage unit and a comparison circuit for comparing the current sensor signal with a voltage reference set by the reference voltage unit; and wherein the timing circuit comprises a feedback circuit between the comparison circuit output and input, which comprises a capacitor (C3) adapted to charge when the cut-off switch is closed and to discharge when the cut-off switch is open.

7. An LED board as claimed in claim 6, wherein the timing circuit comprises a resistor (R6) and diode (D6) in parallel and the capacitor (C3) in series with the parallel resistor-diode.

* * * * *